United States Patent [19]

Stolpe et al.

[11] 4,119,452

[45] Oct. 10, 1978

[54] METHOD OF COATING AND CUTTING WRAPPER BLANKS

[75] Inventors: Erik Stolpe, Porvoo; Arto Honkanen, Helsinki; Erkki Laiho, Kulloo, all of Finland

[73] Assignee: Pekema OY, Helsinki, Finland

[21] Appl. No.: 879,949

[22] Filed: Feb. 21, 1978

Related U.S. Application Data

[63] Continuation of Ser. No. 690,036, May 25, 1976, abandoned.

[30] Foreign Application Priority Data

May 30, 1975 [FI] Finland .................................. 751607

[51] Int. Cl.² .............................................. B29C 27/14
[52] U.S. Cl. ................................ 156/244.19; 118/37; 425/291
[58] Field of Search .............. 156/244.11, 244.12, 156/244.18, 244.19, 244.14, 244.21, 244.22, 244.23, 244.24, 244.26, 244.27; 93/36 R, 36 MM, 36 PC; 264/171; 118/35, 37, 38–43; 427/289; 425/291, 301, 308

[56] References Cited

U.S. PATENT DOCUMENTS

| | | | |
|---|---|---|---|
| 3,455,214 | 7/1969 | Stark et al. | 93/36 R |
| 3,531,350 | 9/1970 | Rausing et al. | 156/244.19 |

Primary Examiner—Morris Kaplan
Attorney, Agent, or Firm—Pennie & Edmonds

[57] ABSTRACT

A method of manufacturing packaging-container blanks is disclosed which method includes forming a substantially continuous sheet of blanks which sheet comprises a substrate and a coating material attached to said substrate. The coating material at the edges of the blanks of said sheet either extends beyond the substrate or is unattached to the substrate adjacent the edge, or both. The sheet of blanks is manufactured by extruding a molten thermoplastic coating material onto the substrate between two revolving cylindrical rolls. The substrate and the coating material are joined in such a manner that at spaced, selected intervals, elongated zones are provided where they are unattached to each other. These unattached zones include zones extending transversely with respect to the sheet of blanks and which transversely extending unattached zones are produced by grooves on the periphery of at least one of the rolls which grooves are suitably arranged at intervals about the periphery of the roll to correspond to the preselected unattached zones desired. The substrate is perforated transversely within the unattached zones so that it may be parted after the coating material is applied by means of a longitudinal jerk. The coating material is cut along the zones by means of blades arranged in the grooves on the grooved roll. Such blades arranged in the grooves may also be used to cut the substrate if desired rather than using the perforated-jerk arrangement. Longitudinally extending unattached zones are also contemplated. Also disclosed is an apparatus for performing the above method.

2 Claims, 12 Drawing Figures

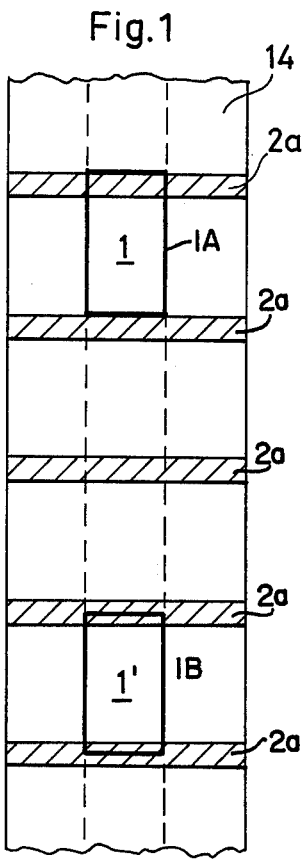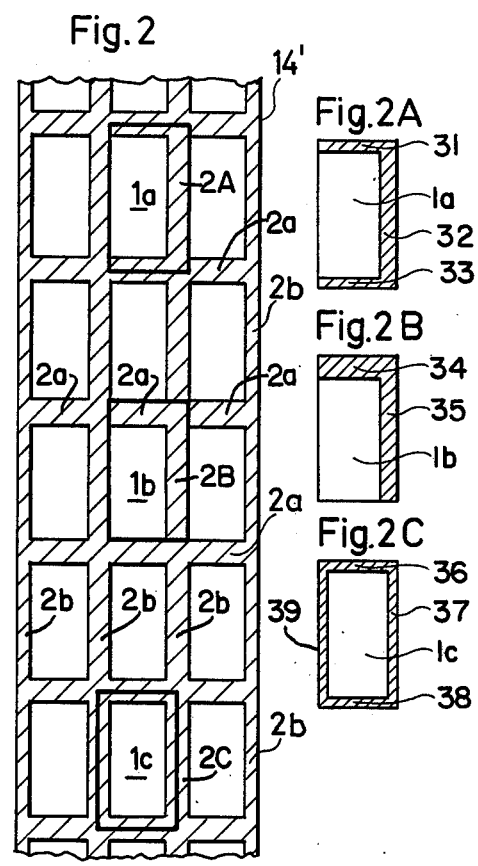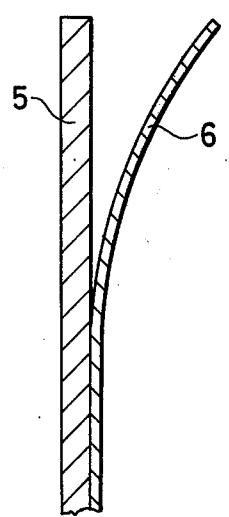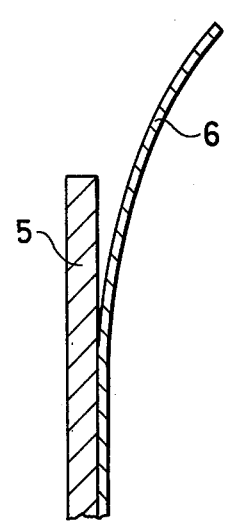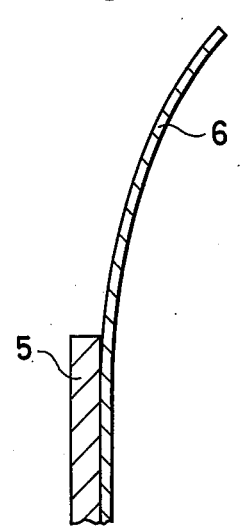

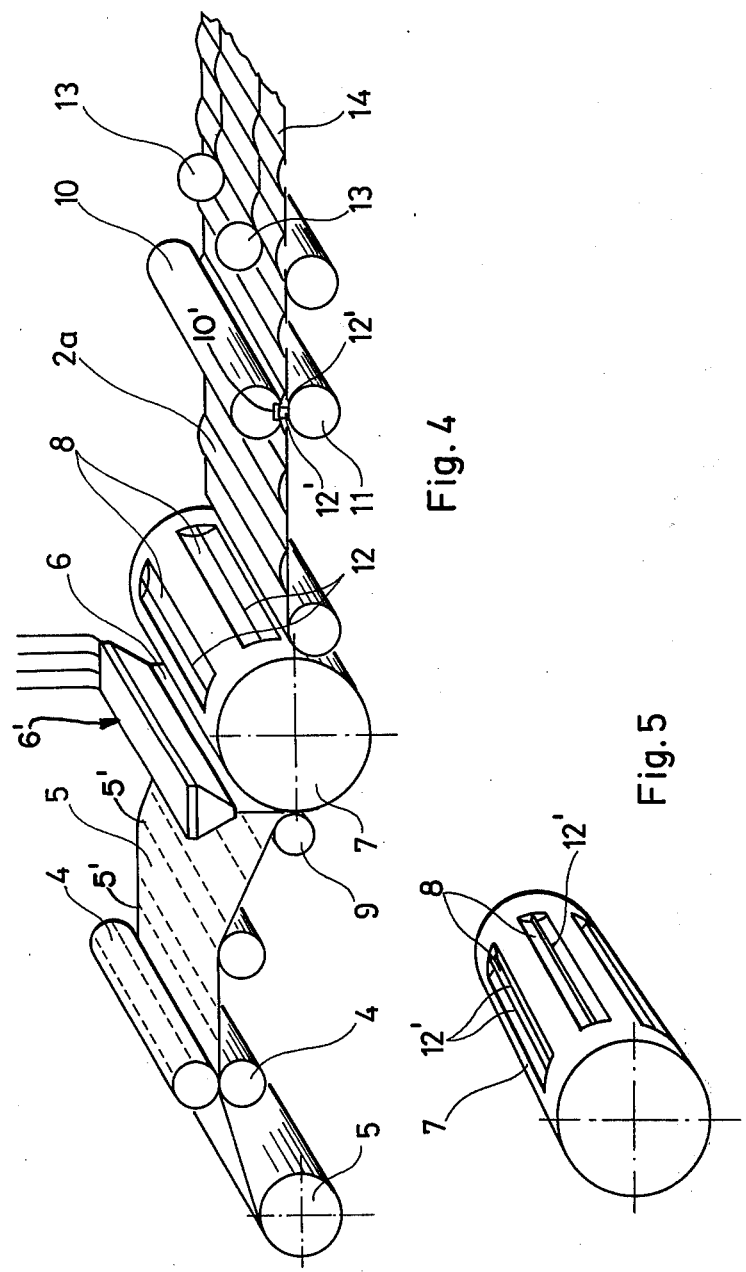

METHOD OF COATING AND CUTTING WRAPPER BLANKS

This is a continuation of application Ser. No. 690,036, filed May 25, 1976, now abandoned.

FIELD OF THE INVENTION

Known packaging-container blanks commonly have complicated shapes and are characterized by the use of glues, waxes and hot melt or heat sealed coatings for closing the blanks. In order to achieve liquid and gas (aroma) tightness at the seals it is generally necessary to use heat sealable coatings on both sides of the blanks as well as separate plastic bands for sealing certain points or to use "bag-in-box" systems. When liquid, particularly greasy, products are to be packaged the raw cut edges of the substrate which are not normally covered with the coating material present a considerable problem since their porosity frequently prevents complete closure of the package and also presents the opportunity for the porous substrate to absorb some of the packaged product.

PRIOR ART

Finnish Pat. No. 49783 discloses a method which solves part of the above-mentioned problem in that a substantially continuous sheet of blanks is produced in which the plastic film secured to the substrate extends laterally beyond the edge of the substrate in a longitudinal strip extending the length of the sheet of blanks. This longitudinal strip is later used for covering the raw cut edge of the substrate when a tube formed from this laminated product is closed. However, the other problems above-mentioned are not resolved by this technique and in particular no means is disclosed dealing with any edges of any blanks which do not correspond to the lateral, longitudinal edges of the sheet of blanks.

BRIEF SUMMARY OF THE INVENTION

The present invention solves the above-mentioned problems and relates to apparatus for the joining of a molten thermoplastic coating material to a substrate in such a way that pre-selected zones at the borders between blanks are provided within which zones the coating material and the substrate are not attached. These zones are produced by means of grooves located at appropriate intervals on the cooling roll or the press roll, preferably the former, thus providing an area where the coating material is not pressed against the substrate. These grooves may extend longitudinally or transversely to the roll or both depending upon the size and shape and requirements of the blanks being ultimately produced from the sheet of blanks. The substrate is cut transversely after coating by jerking the substrate which results in its parting along a perforated line located in a transverse unattached zone. The perforations are provided in the substrate prior to the attachment of the coating material. This jerking operation does not, however, part the coating material which is cut by means of blades positioned within the grooves in the roll. When producing sheets of blanks which blanks are of certain shape or dimension it is in some cases advantageous to use conventional cutting discs or cutting rolls for further cutting of the blanks from the sheet. It is also contemplated as one alternative to cut the substrate (rather than jerking it transverse to a perforated line) by use of conventional cutting discs or rolls as well as by blades positioned within the grooves.

BRIEF DESCRIPTION OF THE DRAWINGS

The apparatus of this invention and their manner of use will be apparent to those skilled in the art from the following specification and the drawings in which:

FIG. 1 shows a sheet of blanks in which the unattached zones are located in the transverse direction of the sheet;

FIG. 1A shows a blank separated from the sheet of blanks of FIG. 1 along the upper heavy outline of FIG. 1 and having the coating material unattached to the substrate along one edge thereof;

FIG. 1B shows a different blank separated from the sheet of blanks of FIG. 1 along the lower heavy outline of FIG. 1 and shows coating material unattached to the substrate along two opposite parallel edges thereof;

FIG. 2 depicts a sheet of blanks in which the unattached zones are both transverse to and longitudinal to the length of the sheet;

FIG. 2A depicts a blank separated from the sheet of blanks along the upper heavy outline in FIG. 2 in which the coating material is unattached to the substrate on three edges which are, as shown, two parallel transverse edges and one longitudinal edge;

FIG. 2B shows a blank separated from the sheet of blanks of FIG. 2 along the heavy outline in the middle of FIG. 2 in which the coating material is unattached to the substrate along two adjacent edges, one of which edges is a transverse edge with respect to the sheet of blanks and the other edge being an adjacent longitudinal edge extending longitudinally of the sheet;

FIG. 2C is a blank separated from the sheet of blanks of FIG. 2 along the heavy outline at the bottom in FIG. 2 in which four edges of the substrate have coating material unattached thereto, two of which edges are opposite transverse edges with respect to the length of the sheet of blanks and the other two of which are opposite longitudinal edges extending longitudinally of the sheet;

FIG. 3A shows a blank separated from a sheet in which the coating material does not extend beyond the edge of the substrate but in which adjacent to such edge the substrate and the coating material are unattached;

FIG. 3B is a figure similar to FIG. 3A excepting that the coating material also extends beyond the edge of the substrate;

FIG. 3C is a view similar to FIG. 3B excepting that the coating material and the substrate are attached over their entire surface and the coating material extends beyond the edge of the substrate;

FIG. 4 is a generally schematic illustration of one embodiment of the apparatus constructed in accordance with the present invention; and FIG. 5 depicts a modified embodiment of the cooling roll of the apparatus of FIG. 4.

DETAILED DESCRIPTION OF THE INVENTION

In FIG. 1 there is shown a sheet 14 of blanks which sheet 14 has transverse unattached zones 2a in which the covering material is not attached to the underlying substrate. FIGS. 1A and 1B show the blanks 1 and 1', respectively, as separated from the sheet of blanks 14 which blanks 1 and 1' have their coating material unattached to the substrate in the areas indicated by the numeral 3a and 3a', respectively. FIG. 1A shows a blank 1 separated from sheet 14 along the heavy line 1A of FIG. 1 and FIG. 1B shows a blank 1' separated from sheet 14 along the heavy line 1B of FIG. 1.

FIG. 2 also shows blanks in a sheet of blanks 14; however, this sheet of blanks 14' has in addition to the transverse unattached zones 2a a plurality of longitudinal unattached zones 2b.

The blanks 1a, 1b and 1c when separated from the sheet of blanks 14' along heavy lines 2A, 2B and 2C, respectively, are shown in FIGS. 2A, 2B and 2C, respectively. The coating material is unattached to the substrate at the edges 31 through 39 which edges may be three adjacent edges (FIG. 2B) two adjacent edges (FIG. 2B) or all four edges of the blank (FIG. 2C).

FIG. 3A shows a blank with an unattached zone of coating material in which the substrate 5 and the coating material 6 have been cut at the same point, i.e., along the same line. In each of FIGS. 3B and 3C a strip of the desired width has been removed from the substrate 5 during the cutting of the blank from the sheet of blanks 14 or 14'. Accordingly, the coating material 6 extends beyond the edge of the substrate 5 in each of FIGS. 3B and 3C. In addition, the embodiment of FIG. 3B shows that adjacent to the edge of the substrate 5 the substrate and the coating material 6 are unattached whereas in FIG. 3C the two are attached throughout their facing surfaces. Any, some or all of the edges 3a, 3a' and 31 through 39 shown in FIGS. 1A, 1B, 2A, 2B and 2C may have the structure shown in any one of FIGS. 3A, 3B and 3C and any blank may have one or more edges of the structure of one of FIG. 3A, 3B or 3C and another edge or edges of a different structure selected from FIGS. 3A, 3B or 3C.

As shown in FIG. 4 the apparatus includes means such as a trough or curtain coater arrangement generally indicated at 6' for providing a sheet of molten thermoplastic coating material 6 in a vertical plane. The sheet of molten thermoplastic coating material extends between two rollers 7 and 9 with roll 9 being the press roll and roll 7 being the cooling roll. The pressure exerted upon the substrate 5 and the thermoplastic coating material 6 as they pass through the rollers 7 and 9 causes the coating material to adhere to the underlying substrate. In selected areas, however, the cooling roll 7 is relieved by grooves 8 which accordingly greatly reduce or eliminate the pressure between the substrate 5 and the coating material 6 when the grooves 8 come into facing relationship with the press roll 9. As shown, the grooves 8 extend transversely to the direction of travel and thus produce transverse unattached zones 2a in the sheets of blanks 14 or 14'.

Mounted within the grooves 8 are blades 12 for cutting the substrate material at selected locations transversely across the entire track in those areas which correspond to the unattached zones 2a produced by the grooves 8.

The apparatus also includes a cutting roll 11 having a stop or backup roll 10 above it. The cutting roll 11 has a pair of parallel closely spaced blades 12' extending along its length, i.e., transverse to the length of the sheet of blanks 14. A cooperating anvil or like member 10' extends along the length of backup roll 10 to cooperate with the pair of parallel blades 12'. In this way a strip material is cut from the substrate 5 from the center of the unattached zone 2a thus producing the edge configuration shown in FIG. 3B. If desired, the parallel blades 12' mounted on the cutting roll 11 may be so adjusted that one of the blades 12' coincides with an edge of the unattached zone 2a and if, further, the blades and the backup roll 10 are so set as to permit the blades 12' to cut through the coating material 6 as well as the substrate 5 then, in that event, a strip will be cut from both substrate 5 and coating material 6 and both will have edges such as shown in FIG. 3A.

The configuration of FIG. 3A can also be produced by single blade 12 operating within unattached zone 2a if the adjustment is such as to cut both the coating layer 6 and substrate 5. Also the configuration of FIG. 3A can be produced when blade 12 cuts through the coating material 6 only if the cut is within the unattached zone 2a and if the cut also aligns with perforations 5' in substrate 5 along which line of perforation 5' the substrate 5 is subsequently parted by a jerk. The edge configuration of FIG. 3B and 3C can also be produced by a single blade 12 cutting only through the coating material 6 if the line of perforations 5' is properly located. If the line of perforations 5' is located intermediate the edge of the unattached zone 2a and the cut made through the coating material 6 by blade 12 then the edge configuration of FIG. 3B will be produced. If the line of perforations 5' is located to coincide with the edge of the unattached zone 2a and the blade cuts the coating material 6 within the unattached zone 2a then in that event the edge configuration of FIG. 3C will be produced upon subsequent separation by jerking.

It will be appreciated by those skilled in the art that double parallel blades such as the double parallel blades 12' may be located in the grooves 8 rather than in a separate cutting roll 11, such modified arrangement and location of the blades 12' is shown in FIG. 5.

As shown, any blades 12 mounted within the grooves 8 will serve to sever at least the coating material 6 and, if of sufficient length, will cut both the coating material 6 and the substrate 5. Similarly, the blades 12' mounted upon the cutting roll 11 are positioned to cut at least the substrate 5 and, if of sufficient length, will also cut the coating material 6. Accordingly, by the selection of the height (radial extent measured from the roll axis) of the blades 12 and 12' and their location either on the roll 7 or the roll 11 or both, it is possible to cut either the substrate 5 or the coating material 6 or both. Accordingly, the the proper selection of a single blade 12 and the location of the perforations 5' or by the proper selection of parallel blades 12' and their location about the axis of roller 11 or roller 7 with respect to the timed infeed of the unattached zone 2a one can provide any one of the edge configurations shown in FIGS. 3A, 3B and 3C in various ways including cutting substrate 5 or parting it by jerking it.

It is presently preferred to cut at least the coating material 6 at the roller 7 while the coating material has still not fully hardened.

FIG. 4 shows rolls 4 which perforate the substrate 5 along the lines indicated by the numeral 5', if desired, and after the coating application the substrate is parted at the perforations in a conventional manner by imparting a jerk thereto. This jerk is applied by means of additional pulling rolls (not shown) located downstream of the rolls 7, 9 and 11, 12 which additional rolls are rotated at a speed greater than that of the upstream rolls 9, 7, 11, 12. Such a parting by means of differential in the rotational speed of downstream rolls does not affect the thermoplastic coating material 6 which remains intact.

While not shown, it will be appreciated that grooves similar to grooves 8 may also be arranged extending about the circumference of roll 7 to provide longitudinal unattached zones 2b. Still further, these additional circumferential grooves may also be provided with one or more blades like blades 12 therein in order to cut at least the coating material 6 and, if of sufficient height with respect to the axis of the roll 7, to also cut through the substrate 5. Depending upon the relative relationship of such circumferential grooves similar to the groove 8 and any blade or blades therein the longitudinal edge, and any intermediate longitudinal unattached zones 2b desired, may be provided with any one of the edges depicted in FIGS. 3A, 3B or 3C.

As shown conventional disc like cutters 13 may be used for cutting either the coating material 6, the substrate 5 (in which case they would be positioned below the sheet of blanks 14) or both. Such revolving cutters 13 may be and are preferably positioned to coincide with longitudinal unattached zones 2b.

It will be appreciated by those skilled in the art that while for convenience the blanks 1 have been described and shown as rectangular any desired shape may use the disclosed invention with any one of the edges shown in FIGS. 3A, 3B and 3C.

Among the advantages of the present invention, for example when cardboard and a thermoplastic coating material are used, is that the unattached zones of these materials facilitate the bending of the coating material in the corner areas of the package. When producing a tight package it is possible to do so without resorting to coating on both sides of the substrate.

Also the number of package steps can be reduced in comparison with the use of such devices as separate sealing bands as in the Finnish patent or the use of double packages of the "bag-in-box" type or the like. As such considerable advantages are obtained particularly when packaging liquid or frozen products. Still further, if the material to be packaged does not require rigid walls on all sides as for example at the ends of cylinders, blanks of the present invention may be quite economically and advantageously utilized.

The substrate may be of any suitable material including but not limited to cardboard, paper, certain films and the like and the coating material of any suitable thermoplastic such as polyethylene. The substrate can be but a single homogenous layer of a given material or a basic layer coated on one or both sides or a laminate having one or more laminae applied to one or more sides. It will also be appreciated that the sheet of blanks 14 after manufacture may itself serve as a substrate whereby the opposite side may have applied thereto a suitable thermoplastic coating which also includes selected unattached zones.

It is also contemplated that a plurality of lengths of substrate may be fed in parallel spaced fashion through the rolls 9 and 7 to have applied thereto the coating material 6 in which event longitudinal cutting of the substrate at least is eliminated with the cutting of the thermoplastic layer being accomplished by the rotary disc 13. It is contemplated that an anti-adhesion agent may be applied before the coating procedure to the proposed and pre-selected unattached zones in areas to be engaged by the grooves 8 thus to further insure that the coating material 6 does not become attached to the substrate 5.

What is claimed is:

1. A method for manufacturing packaging-container blanks comprising extruding a molten thermoplastic coating material onto a substrate to form a sheet of blanks for subsequent separation into a plurality of container blanks, extruding said thermoplastic material onto said substrate between two revolving cylindrical rolls whereby the pressure of said rolls causes said coating material and said substrate to become attached to each other, reducing the pressure of said rolls to prevent the attachment of said coating material and said substrate to each other in a plurality of spaced selected elongated zones extending transverse to the length of the sheet of blanks and along at least one edge of each of the blanks to be produced from said sheet by means of grooves in one of said cylindrical rolls so located as to produce said reduction in pressure between said rolls in said selected zones, cutting transversely said thermoplastic material before the same has fully hardened by means of elongated knives located in at least some of said transverse grooves, and subsequently separating said sheet of blanks into a plurality of blanks.

2. The method of claim 1 in which said subsequent separation includes a cutting by a cutting roll cooperating with a stop roll which cutting roll has at least one blade extending transversely of the length of the blank.

* * * * *